United States Patent [19]

Courtright

[11] Patent Number: 4,598,628
[45] Date of Patent: Jul. 8, 1986

[54] ROTARY HYDRAULIC ENGINE HAVING OPPOSITELY DISPOSED PISTONS IN A SCOTCH YOKE ASSEMBLY

[75] Inventor: Harold D. Courtright, McDonald, Kans.

[73] Assignee: 4 Square Motors, McDonald, Kans.

[21] Appl. No.: 612,252

[22] Filed: May 21, 1984

[51] Int. Cl.$^4$ .............................. F01B 13/06
[52] U.S. Cl. ......................... 91/481; 91/491; 91/493; 417/273; 417/334; 60/370; 60/398; 60/408
[58] Field of Search .......... 91/472, 476, 478, 480–482, 91/491–495, 191, 192; 92/58, 72, 148; 417/273, 237, 323, 324, 334; 60/370, 398, 408

[56] References Cited

U.S. PATENT DOCUMENTS

| | | |
|---|---|---|
| 82,007 | 9/1868 | Kipp, Jr. |
| 272,616 | 2/1883 | Annibale |
| 394,684 | 12/1888 | Farmer |
| 743,230 | 11/1903 | Blasdell |
| 756,362 | 4/1904 | Hazelrigg |
| 890,532 | 6/1908 | Schmucker |
| 956,881 | 5/1910 | Bonnett |
| 966,622 | 8/1910 | Thompson, Jr. ................ 91/481 |
| 1,045,505 | 11/1912 | Brauer |
| 1,053,991 | 2/1913 | Henderson ................ 417/237 |
| 1,061,923 | 5/1913 | Pealer |
| 1,132,393 | 3/1915 | Schmucker ................ 417/237 |
| 1,227,452 | 5/1917 | Kenyon |
| 1,236,922 | 8/1917 | Gibbs ................ 60/408 |
| 1,631,425 | 6/1927 | Marcus et al. ................ 417/273 |
| 1,696,673 | 12/1928 | Fourness ................ 91/493 X |
| 1,980,924 | 11/1934 | McDonald |
| 2,045,330 | 6/1936 | MacMillin |
| 2,147,666 | 2/1939 | Park |
| 2,311,064 | 2/1943 | McCrary |
| 2,683,422 | 7/1954 | Richards, Jr. |
| 3,093,301 | 6/1963 | Mitchell |
| 3,220,390 | 11/1965 | Grunstra |
| 3,823,697 | 7/1974 | Von Esch |
| 3,890,941 | 6/1975 | Paul, Jr. |
| 4,055,950 | 11/1977 | Grossman ................ 60/398 |
| 4,058,979 | 11/1977 | Germain ................ 60/398 |
| 4,072,445 | 2/1978 | Hay |
| 4,106,391 | 8/1978 | Wheeler ................ 91/481 |
| 4,136,602 | 1/1979 | Lenz ................ 91/491 |
| 4,174,926 | 11/1979 | Hamrick et al. ................ 417/334 |

FOREIGN PATENT DOCUMENTS

| 351803 | 5/1905 | France ................ 91/493 |
|---|---|---|
| 2007315 | 5/1979 | United Kingdom ................ 60/408 |

*Primary Examiner*—William L. Freeh
*Assistant Examiner*—Paul F. Neils
*Attorney, Agent, or Firm*—Welsh & Katz, Ltd.

[57] ABSTRACT

A rotary hydraulic engine is disclosed having a stationary crankshaft with an eccentric crank portion disposed thereon. A housing is rotatable about the crankshaft. At least two pairs of cylinders are connected to the housing and extend quadrilaterally therefrom. A piston is slidingly disposed within each cylinder, and is connected to an oppositely disposed piston so as to move in tandem when propelled by a fluid under pressure. An external valve mechanism is provided which is connected to the cylinders so as to sequentially actuate the pistons contained therein when supplied with fluid under pressure. A scotch yoke assembly integrates the motion of the pairs of pistons into a balanced array of weight and force vectors rotating around the axis of the eccentric crank portion of the stationary crankshaft. This sequential reciprocation of the pairs of pistons imparts a rotary motion to the housing, the rotary motion in turn causing the housing to act as a flywheel. A transmission mechanism such as a belt drive is attached to the housing for conveying rotary motion to a desired mechanical apparatus, or alternatively for driving the engine. As a result, the engine may be driven by an external source of energy such as wind for compressing air, and later selectively driven by the compressed air collected.

18 Claims, 14 Drawing Figures

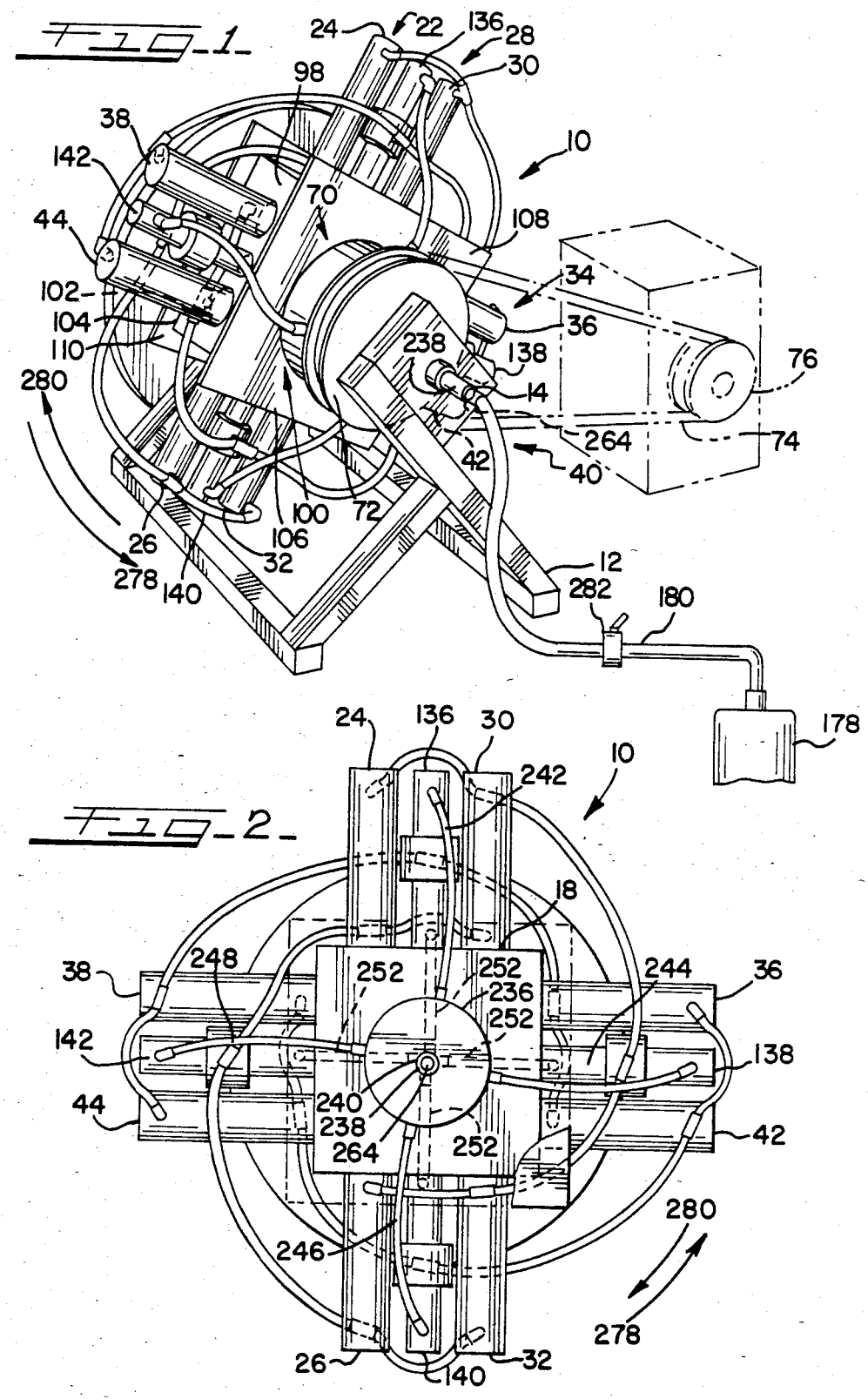

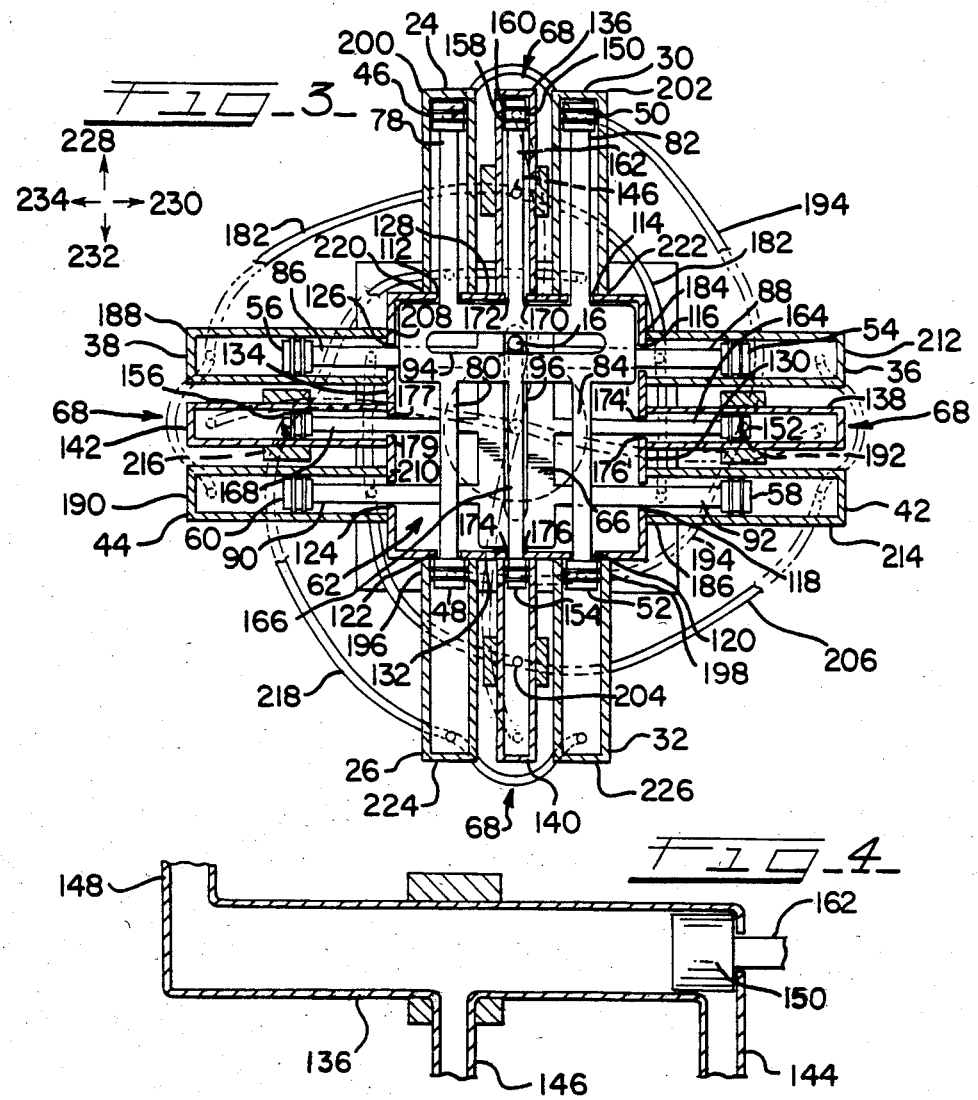

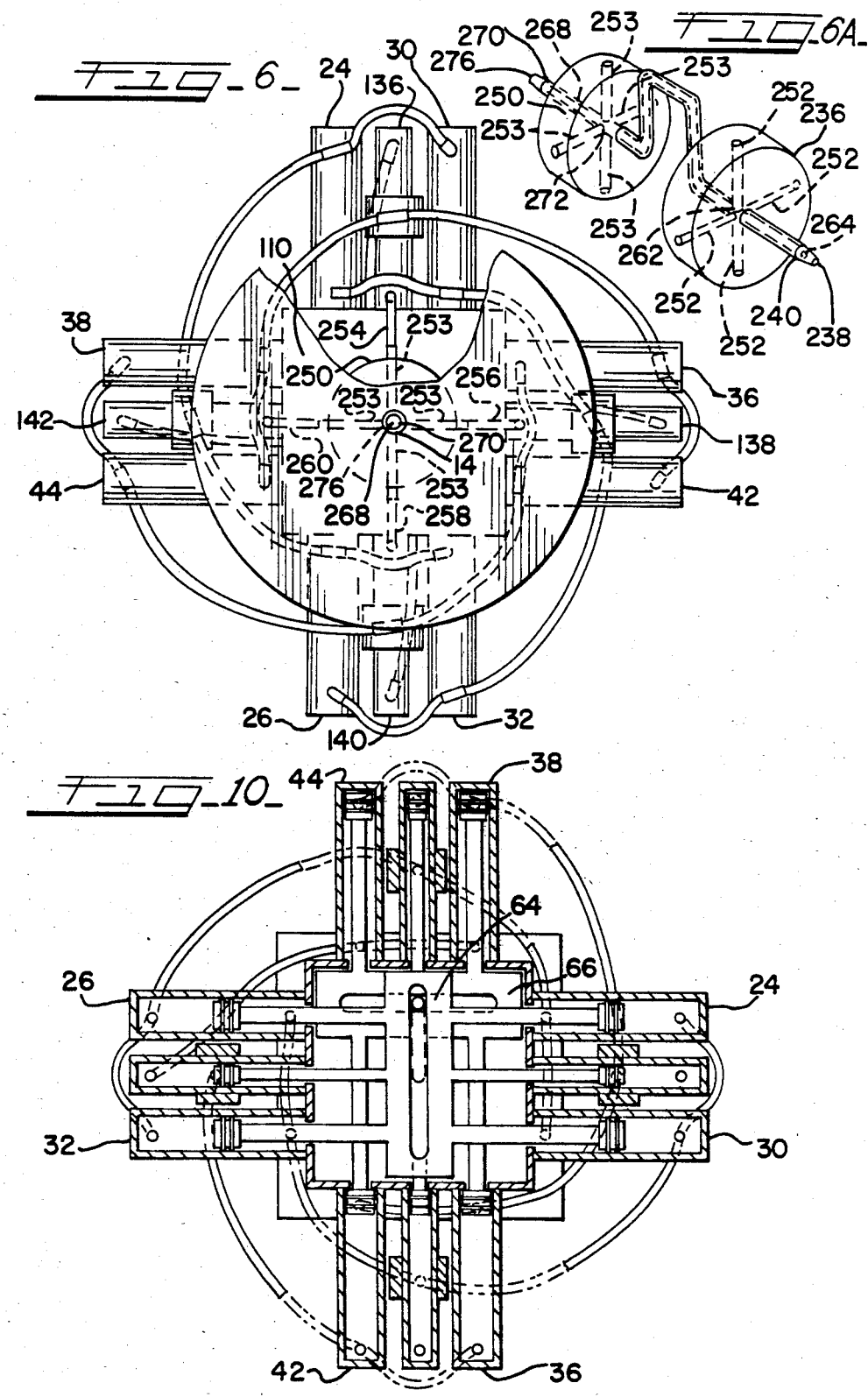

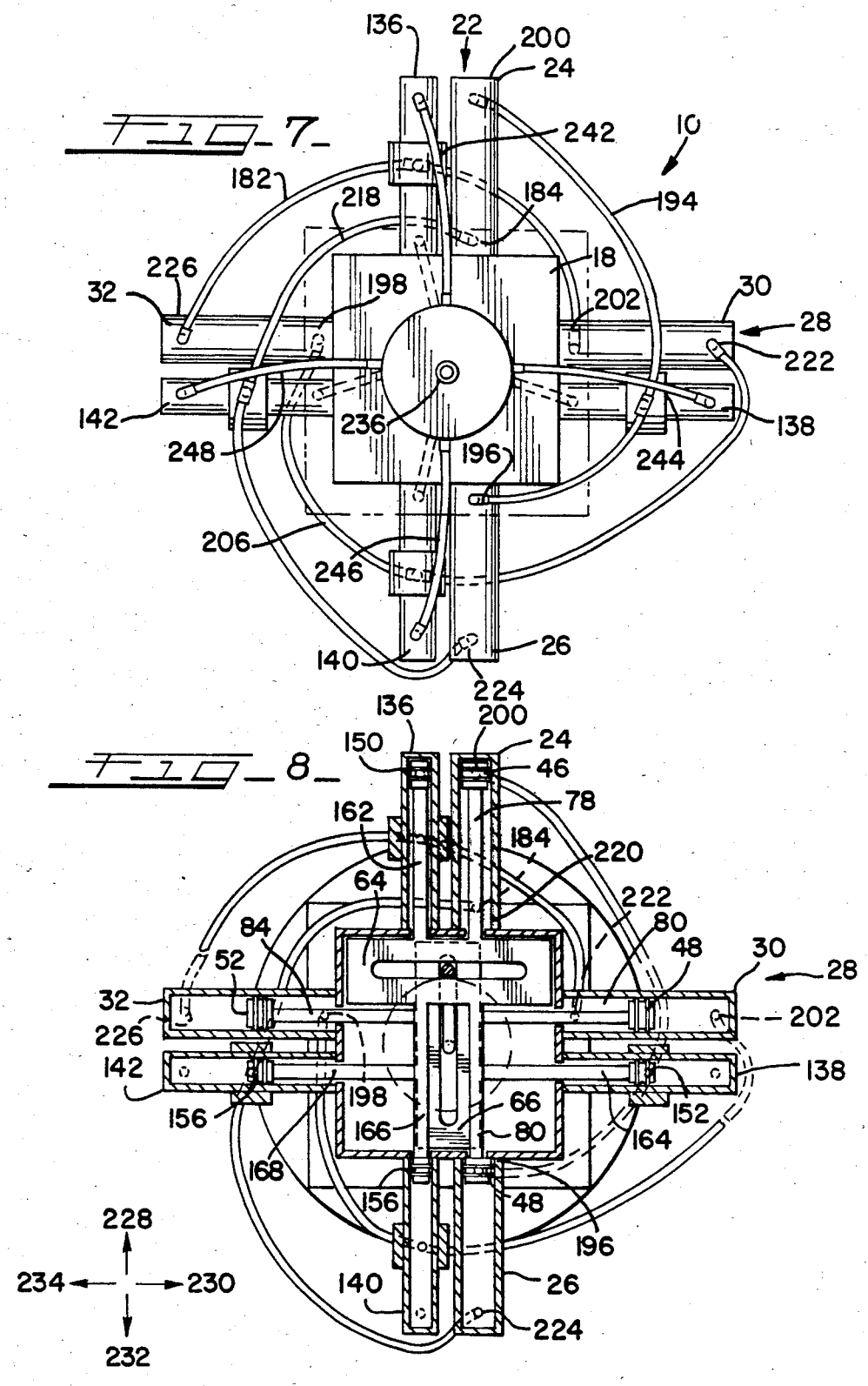

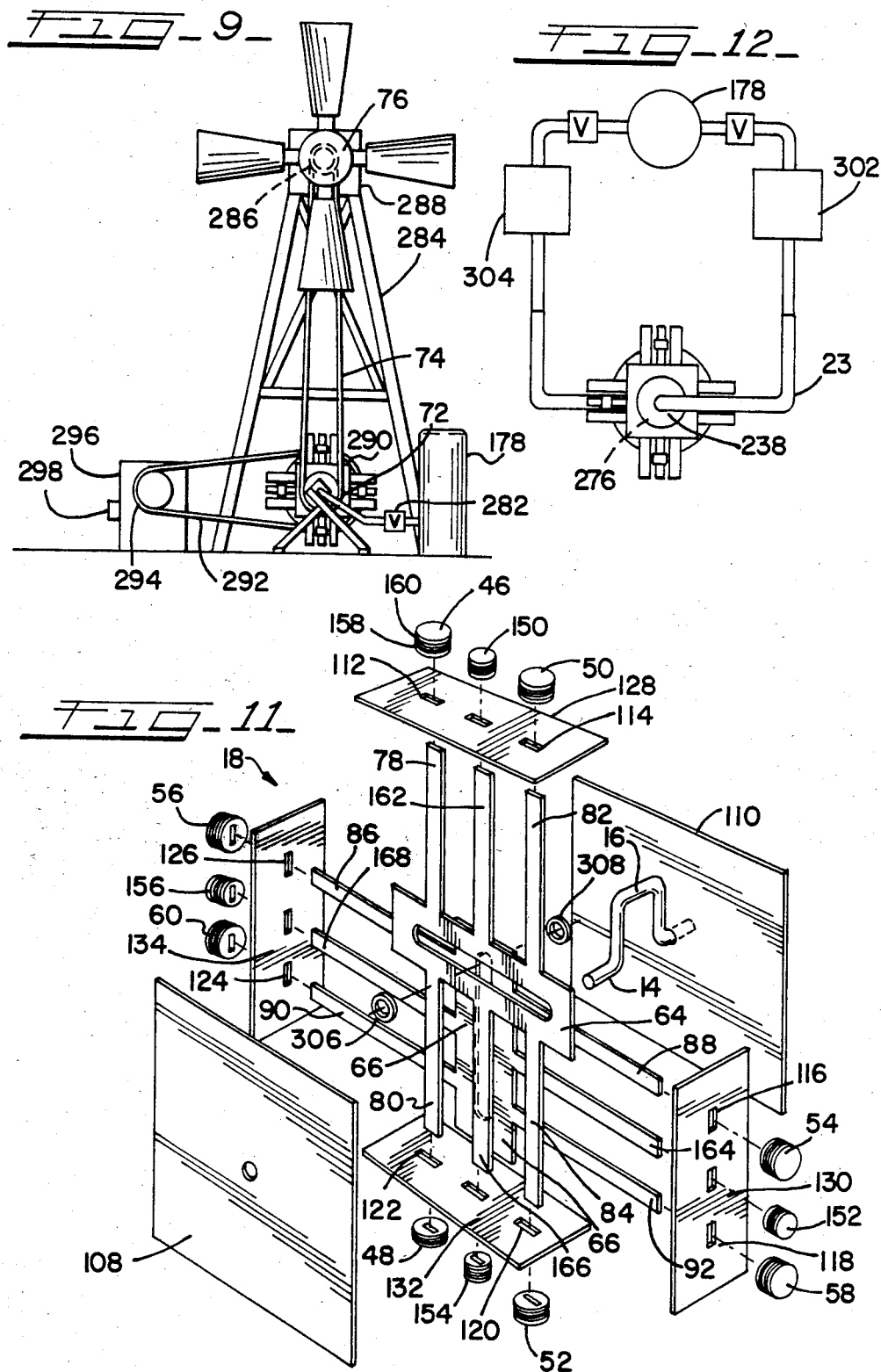

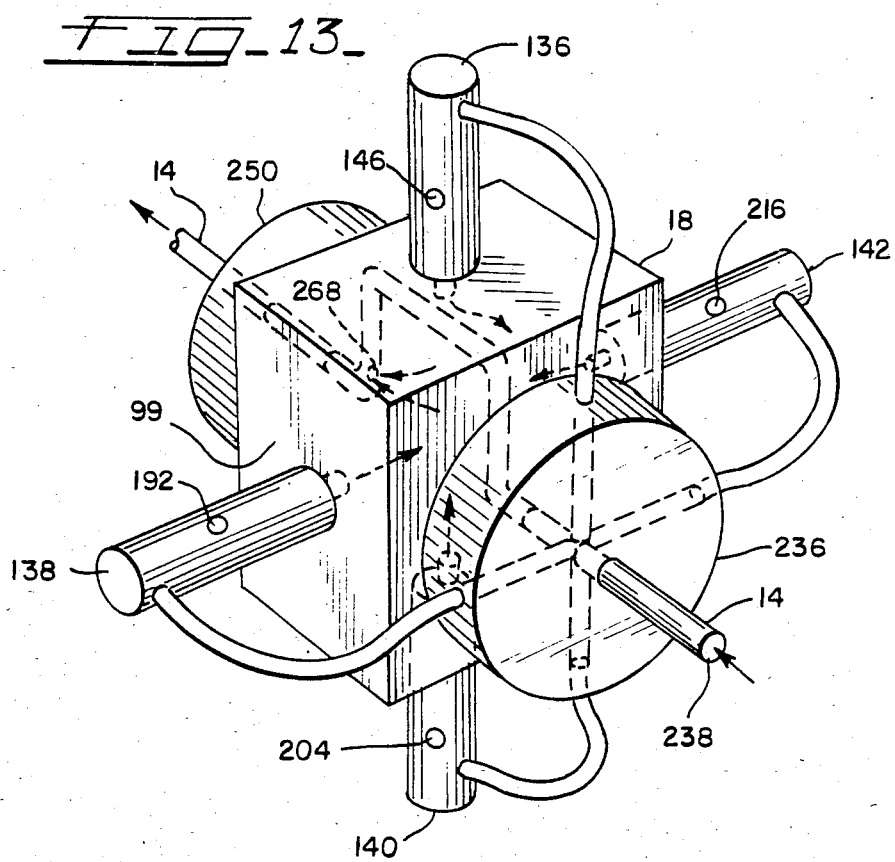

ROTARY HYDRAULIC ENGINE HAVING OPPOSITELY DISPOSED PISTONS IN A SCOTCH YOKE ASSEMBLY

BACKGROUND OF THE INVENTION

The present invention relates generally to rotary engines and in particular to rotary hydraulic engines which may be driven from a source of fluid under pressure such as compressed air.

Over the last 100 years a wide variety of rotary engines have been developed which operate on steam, gasoline, compressed air, electromagnetism, or the like. Examples may be seen in the following United States Patents.

| U.S. Pat. No. | Title of Invention | Issue Date | Inventor |
| --- | --- | --- | --- |
| 82,007 | Improvement In Rotary Steam-Engines | 9-8-1868 | Abraham Kipp, Jr. |
| 272,616 | Force Pump | 2-20-1883 | A. Annibale |
| 394,684 | Rotary Engine | 12-18-1888 | J. M. Farmer |
| 743,230 | Rotary Explosive Engine | 11-3-1903 | G. C. Blasdell |
| 756,362 | Rotary Engine | 4-5-1904 | R. Hazelrigg |
| 890,532 | Explosive Engine | 6-9-1908 | A. P. Schmucker |
| 956,881 | Gasoline Engine | 5-3-1910 | J. C. Bonnett |
| 1,045,505 | Two Stroke Cycle Internal Combustion Engine | 11-26-1912 | G. A. Brauer |
| 1,061,923 | Internal Combustion Engine | 5-13-1913 | J. C. Pealer |
| 1,227,451 | Rotating Cylinder Gas Engine | 5-22-1917 | B. C. Kenyon |
| 1,980,924 | Rotary Gas Engine | 11-13-1934 | C. G. McDonald |
| 2,045,330 | Radial Plunger Pump | 6-23-1936 | H. F. MacMillin |
| 2,311,064 | Gyroscopic Internal Combustion Engine | 2-16-1943 | P. R. McCrary |
| 2,683,422 | Rotary Engine Or Compressor | 7-13-1954 | A. Z. Richards, Jr. |
| 3,093,301 | Lubricating System For Compressor | 6-11-1963 | O. Mitchell |
| 3,220,390 | Rodless Rotary Engines | 11-30-1965 | P. C. Grunstra |
| 3,784,334 | Electromagnetically Driven Fluid Compressing Apparatus | 1-8-1974 | Adolph J. Hilgert |
| 3,823,697 | Multicylinder Motor Or Engine With Double-Acting Pistons | 7-16-1974 | Paul Von Esch |
| 3,894,817 | Oscillatory Armature Piston Pump | 7-15-1975 | Istvan Majoros, Franz Kiss Horvath |
| 4,072,445 | Rotary Gas Pressure Engine System | 2-7-1978 | Johnny L. Hay |
| 4,249,487 | Rotary Internal Combustion Engine | 2-10-1981 | Robert B. Chambers |
| 4,374,330 | Control Circuit For A Part Which Is Moved In An Oscillating Manner By An Electric Drive | 2-15-1983 | Rainer Fey |

In most of the above listed rotary engines such as Kipp, U.S. Pat. No. 82,007, a housing rotates about a fixed crankshaft, such as in the present invention. In addition, as seen in U.S. Pat. No. 2,683,422, it has been known in the past to utilize a rotary engine as a compressor. It has also been known to utilize a rotary engine to pump liquids. However, a frequent problem with rotary engines such as those disclosed is that the valving mechanism utilized is contained within the housing and frequently wears rapidly so that an effective seal is not maintained for a sufficient period of time. An additional problem in this regard is that the construction of virtually all of the rotary engines in the aforesaid patents requires special machining to very tight tolerances of both housing and pistons.

SUMMARY OF THE INVENTION

Accordingly, a general object of the present invention is to provide an inexpensive rotary hydraulic engine which has simple, easy to manufacture interchangeable parts.

A more particular object of the present invention is to provide a rotary hydraulic engine having an external valve mechanism which is easily replaced, inexpensive, of a standardized construction and capable of maintaining a fluid tight seal for an extended period of time.

In accordance with the present invention, a rotary hydraulic engine is provided having a stationary crankshaft fixedly attached to and supported by a frame, with an eccentric crank portion disposed thereon. The housing of the engine is rotatable about the crankshaft. At least two pairs of cylinders are connected to the housing in laterally opposed sets. Each cylinder is coaxial with an opposed cylinder. The cylinders are quadrilaterally disposed from each other; radially disposed in four quadrants. A piston is slidingly disposed within each cylinder. Each of the pistons is coaxial with and oppositely disposed to its pair, so as to move in tandem when propelled by a fluid under pressure, such as compressed air. An external valve mechanism is connected to the cylinders for sequentially actuating the pistons. Hydraulic pressure is provided through the external valve mechanism to the cylinders.

A scotch yoke assembly integrates the motion of the pairs of pistons into a balanced array of weight and force vectors rotating around the axis of the eccentric crank portion of the stationary crankshaft. The scotch yoke assembly includes a first slide member having oppositely disposed arms connecting at least one pair of pistons and a second slide member disposed in a plane parallel to the first slide member, with oppositely disposed arms connecting at least one other pair of pistons. The arms of the first slide member are substantially normal to the arms extending to the second slide member. The first and second slide members have respectfully first and second slots formed therein and disposed at substantially right angles to each other. The slots are adapted for slidable reception of the eccentric crank portion of the stationary crankshaft. As a result when the first and second slide members move about the eccentric crank portion, they are positioned relative to each other by the eccentric crank portion. The motion of the pairs of pistons is integrated by the interaction of the eccentric crank portion with the first and second slots into a sequential reciprocation of the pairs of pistons which in turn imparts a rotary motion to the housing. The housing thus acts as a flywheel which, when connected to a transmission mechanism such as a belt drive, conveys the rotary motion of the housing to a selected mechanical apparatus such as a water pump.

In one embodiment the housing of the rotary hydraulic engine is substantially square and has a hollow interior adapted for reception of the scotch yoke assembly. Front and rear plates are affixed to and seal the front and rear of the body member.

The external valve mechanism, in one embodiment, has four shuttle valve members quadrilaterally disposed and extending from the periphery of the housing. The shuttle valve members are in fluid communication with a source of hydraulic pressure. Each of the shuttle valve members contains a plurality of ports for selectively permitting the passage of hydraulic pressure to a selected one of the cylinders or alternatively for the venting of the hydraulic pressure from the cylinders. In one embodiment standard commercial pistons and cylinders such as those manufactured by Clippard Mfg., Canton, Ohio, are modified by adding a manifold collector ring at the center of the cylinder and drilling center ports to connect the valve to the manifold ring.

In one embodiment, the rotary hydraulic engine of the present invention has four pair of cylinders connected to the housing. The first and second pairs of cylinders are positioned in parallel to each other so as to provide two cylinders on a first side of the body member and two oppositely disposed cylinders on the second side of the body member. The third and fourth pair of cylinders are again positioned in parallel to each so as to provide two cylinders on the third side of the body member and two cylinders on a fourth side of the body member. A piston is slidingly disposed within each cylinder; and is coaxial to an oppositely disposed piston. Each of the pistons is connected by arms extending from a slide member to a matching piston in its oppositely disposed cylinder so as to reciprocate in tandem when propelled by a fluid under pressure. The first, second, third and fourth pairs of oppositely disposed pistons are arrayed in a substantially balanced quadrilateral configuration so that as the housing rotates, the movement of the pistons tends to impart a rotary motion to the housing. In one embodiment, each of the slide members has four arms extending from it which are connected to the piston; two oppositely directed pairs of arms on each side. The resulting substantially H-shaped configuration helps balance the forces on the slides which translate the reciprocating motion into rotary motion.

In one embodiment, the previously mentioned shuttle valve contains a shuttle valve piston slidingly disposed therein. The shuttle valve piston in turn is connected to a shuttle valve piston arm which is connected to one of the respective slide members of the scotch yoke assembly. As a result, each of the shuttle valve pistons reciprocates in tandem with a slide member, thereby sequentially opening or closing selected ports within the shuttle valve. Fluid pressure is thereby selectively directed to the pistons as required.

In one embodiment, the stationary crankshaft includes a pair of oppositely disposed hubs rotatably mounted on the crankshaft and connected to the housing. The crankshaft in turn includes hose couplings at each end. A fluid passageway extends through the hubs so as to allow the passage of fluid under pressure to or from the check valves. A set of flexible tubes extends from the hose couplings to the shuttle valves for conveying fluid under pressure to or from the shuttle valves as required. The previously mentioned ports in the shuttle valves include an intake inlet, and two exhaust outlets. The intake inlet is in fluid communication with one of the hose couplings so as to admit fluid under pressure from a source of hydraulic pressure. One of the exhaust outlets is in fluid communication with at least one of the pairs of cylinders so as to selectively pressurize the pair of cylinders. A second exhaust outlet is in fluid communication with the other hose coupling so as to selectively exhaust fluid under pressure from one of the pair of cylinders through the shuttle valve, the hub, and out of the hose coupling. As a result, the housing is rotated in a first direction. When fluid under pressure is connected to the second hub, the housing is rotated in a second opposite direction.

In one embodiment, the interior of the housing is in fluid communication with the pistons so that fluid under pressure may be selectively pumped from the interior of the housing and out the ports of the shuttle valve members or conversely fluid under pressure may be drawn into the interior of the housing and out the interior of the crankshaft.

In one embodiment, the fluid under pressure comprises compressed air. The hydraulic pressure mechanism comprises a tank for the holding of compressed air and a switching valve adapted for selective admission of compressed air into the tank or expulsion of compressed air from the tank as desired. As a result, rotation of the housing in a first direction is effective to draw air into one of the hub members, to compress the air in the cylinders of the engine and to pump the air from the cylinders through a second one of the hub members, through the switching valve and into the tank. Conversely, when the switching valve is set for expulsion of compressed air out of the tank, then compressed air is permitted to pass through the second hub member, through the tubing and into the cylinders so as to propel the pistons, thereby causing rotary motion of the housing in a second opposite direction. As a result, the engine may be selectively utilized as a compressor for collecting compressed air in a holding tank and then resversed and used as a rotary engine driven by the compressed air in the tank. A transmission such as a belt drive is used for driving the engine, or for having the engine drive another device. In one embodiment, the transmission includes a pulley attached to the housing and rotatably disposed about the stationary crankshaft.

A belt disposed about the pulley is attached to a drive wheel of a selected mechanical apparatus such as a water pump for transmitting mechanical force thereto.

In one embodiment, the rotary hydraulic engine is connected by the belt drive to a windmill which may be used for driving the engine in a first direction so as to pump compressed air into the tank. As a result, in a first mode energy may be selectively stored in the form of compressed air and alternatively in a second mode used to drive the rotary engine in a second mode. In addition, when the rotary engine is being driven by the compressed air, the pulley may be connected by a belt drive to a second mechanical apparatus such as a water pump so as to irrigate crops.

In one additional alternative, because of the liquid tight seals in the present invention, the engine may be selectively utilized to store energy in the form of compressed air in a first mode and to pump water through the cylinders when driven by the fly wheel in a second direction.

Because the previously mentioned engine may be used as a compressor, it may also be used as a heat pump. A condenser mechanism is in fluid communication with the cylinders and is interposed on the entrance side, between the cylinders and the tank. An evaporator mechanism is interposed between the tank and the cylinders on the exit side of the tank. As a result, the rotary energy convertor may be used as a heat pump for supplying heat from the condenser or as a refrigeration unit by utilizing the evaporator. Thus, as indicated above, when the transmission mechanism is used for rotating the housing, the rotary engine may selectively be used as an air compressor, a liquid pump, a heat pump or the like.

BRIEF DESCRIPTION OF THE DRAWINGS

FIG. 1 is a front perspective view of the rotary hydraulic engine of the present invention.

FIG. 2 is a front view of the rotary hydraulic engine of FIG. 1.

FIG. 3 is a vertical section of the rotary hydraulic engine of FIG. 1.

FIG. 4 is the side cutaway view of a shuttle valve used in the rotary hydraulic engine of FIG. 1, showing in particular a shuttle valve piston slidingly disposed within the shuttle valve.

FIG. 5 is a side cutaway view of the shuttle valve of FIG. 4 showing in particular the shuttle valve piston in an alternate position within the shuttle valve.

FIG. 6 is a rear cutway view of the rotary hydraulic engine of FIG. 1.

FIG. 6A is a front perspective view of the crankshaft and hub of the rotary engine of FIG. 1.

FIG. 7 is a front perspective view of a rotary hydraulic engine having four pistons instead of eight.

FIG. 9 is a front perspective view of the rotary hydraulic engine of FIG. 1 connected by belt drive to a windmill and a water pump.

FIG. 8 is a front cutaway view of the rotary hydraulic engine of FIG. 7.

FIG. 10 is an additional front cutaway view of the rotary hydraulic engine of FIG. 1 showing the pistons and slide members in an alternate position.

FIG. 11 is an exploded view of the pistons, slide members, and housing of FIG. 1 of the drawings.

FIG. 12 is a schematic diagram of the rotary hydraulic engine of FIG. 1 used as a heat pump.

FIG. 13 is a schematic diagram of the rotary hydraulic engine of FIG. 1 in which the shuttle valves vent directly into the housing body, through a lumen into the crankshaft and out of the crankshaft.

DETAILED DESCRIPTION OF THE PREFERRED EMBODIMENT

Referring now to the drawings, and in particular to FIG. 1, a rotary hydraulic engine constructed in accordance with the present invention is indicated generally at 10 and is supported by a frame 12 through which a crankshaft 14 extends in substantially fixed relation therewith. Crankshaft 14 has an eccentric crank portion 16 formed thereon, (as best seen in FIG. 11). Housing 18 encircles crankshaft 14 and is rotatable relative thereto. The positioning of housing 18 relative to eccentric crank portion 16 of crankshaft 14 may be best be seen in FIG. 3 of the drawings. Housing 18 has a plurality of pairs of cylinders 20 extending therefrom and disposed in laterally opposed sets of two such that each cylinder is laterally opposed to and coaxial with an opposed cylinder. Specifically, a first pair of cylinders 22 includes first cylinder 24 which is laterally opposed to and coaxial with opposed second cylinder 26. Second pair of cylinders 28 includes third cylinder 30 which is laterally opposed to and coaxial with a fourth cylinder 32. A third pair of cylinders 34 includes fifth cylinder 36 which is laterally opposed to and coaxial with sixth cylinder 38. A fourth pair of cylinders 40 includes seventh cylinder 42 which is laterally opposed to and coaxial with an eighth cylinder 44. As best seen in FIG. 3, a piston such as first piston 46 is slidingly disposed within each of the cylinders, in this case first cylinder 24. Second piston 48 is slidingly disposed in second cylinder 26. Third piston 50 is slidingly disposed within third cylinder 30. Fourth piston 52 is slidingly disposed within fourth cylinder 32. Fifth piston 54 is slidingly disposed within fifth cylinder 36. Sixth piston 56 is slidingly disposed within sixth cylinder 38. Seventh piston 58 is slidingly disposed within seventh cylinder 42. Eighth piston 60 is slidingly disposed within eighth cylinder 44. A scotch yoke assembly 62 is provided for integrating the movements of pistons 46 through 60. Scotch yoke assembly 62 is made up of a pair of discrete slide members; first slide member 64 and second slide member 66. First slide member 64 interconnects pistons 46, 48, 50 and 52. Second slide member 66 interconnects pistons 54, 56, 58 and 60. First slide member 64 and second slide member 66 interact with eccentric crank portion 16 of stationary crankshaft 14 so that pistons 46, 48, 50 and 52 move in tandem. Similarly, second slide member 66 interacts with eccentric crank portion 16 so that pistons 54, 56, 58 and 60 also move in tandem, and are integrated in their movement relative to first slide member 64. However, first slide member 64 and second slide member 66 do not move in tandem, but rather are moved in a sequence determined by their relative position to eccentric crank portion 16. The reciprocal movement of pistons 46 through 60 causes housing 18 to rotate relative to crankshaft 14.

The means for propelling pistons 46 through 60 is a fluid under pressure. External valve mechanism 68 is operatively associated with cylinders 24 through 44 so as to enable selective application of fluid pressure to pistons 46 through 60 in a sequence which causes housing 18 to rotate. Specifically, the pump stroke of each piston sequentially overlaps the one 90 degrees prior to itself in rotation, then is in turn sequentially overlapped by the one 90 degrees behind it in rotation. This is accomplished, in part, by the fixed position of eccentric crank portion 16 relative to the longitudinal axis of first slide member 64 and second slide member 66. The movement of the respective pistons pushes against eccentric crank portion 16 causing housing 18 to move relative thereto. The sequential actuation of pistons 46 through 60 integrates such movement into a rotary motion of housing 18.

Returning to FIG. 1 of the drawings, a transmission mechanism 70 is provided for operatively interacting with an external apparatus, shown in phantom, which enables transfer of the rotary motion of housing 18 to the external apparatus. In the embodiment shown, mechanism 70 is a pulley 72 which has a belt drive 74 disposed thereon for connection to a drive pulley 76 of a selected external apparatus.

As seen in FIG. 3 of the drawings, slide member 64 has a plurality of oppositely disposed arms. Specifically, pistons 46 and 48 are connected to first slide member 64 by oppositely disposed arms 78 and 80. Similarly, oppositely disposed arms 82 and 84 extend from first slide member 64 to pistons 50 and 52, respectively. Second slide member 66 is disposed in a plane parallel to but not identical to the plane of first slide member 64. Second slide member 66 has oppositely disposed arms 86 and 88 connecting pistons 54 and 56, respectively. Oppositely disposed arms 90 and 92 interconnect pistons 58 and 60, respectively. Arms 86, 88, 90 and 92 are substantially normal to; i.e. at a right angle to arms 78, 80, 82 and 84.

First slide member 64 has a first longitudinal slot 94 therein which is adapted for slidable reception of eccentric crank portion 16 of stationary crank 14. Second slide member 66 has a second longitudinal slot 96 formed therein which is disposed at substantially a right angle to first longitudinal slot 94. Second longitudinal slot 96 is also adapted for slidable reception of eccentric crank portion 16 of stationary crankshaft 14. As first slide member 64 and second slide member 66 move about eccentric crank portion 16, their position relative to each other is controlled by the interaction of first slot 94 and second slot 96 with eccentric crank portion 16. As a result, the motion of pistons 46 through 60 is integrated into a sequential reciprocation of the pistons, which in turn imparts a rotary motion to the housing. The pump stroke of each piston 46-60 respectively overlaps the one 90 degrees prior to it, then is in turn overlapped by the one 90 degrees behind it in rotation. This sequence results in rotation of the housing.

An additional feature of the invention may be best seen in FIG. 11 of the drawings. Housing 18 is constructed from a substantially square body member 98 of substantially uniform weight distribution having a hollow interior 99 which is adapted for reception of scotch yoke assembly 62. Square body member 98 has openings at 100 and 102 at its proximal 104 and distal 106 ends. A front plate member 108 is affixed to and seals opening 100 of square body 98. A rear plate member 110 is affixed to and seals opening 102 of distal end 106. As best seen in FIG. 11, a plurality of radially disposed openings 112, 114, 116, 118, 120, 122, 124 and 126 are positioned about the periphery of square body member 98. Openings 112 through 126, respectively, are sized and positioned for telescopic reception of and slidable sealing with arms 78 through 92 respectively from first and second slide members 64 and 66. Thus, scotch yoke assembly 62 is contained within housing 18 while at the same time arms 78 through 92 extend from housing 18 into cylinders 24 through 44.

In one embodiment, housing 18 is hermetically sealed about its periphery and hollow interior 99 is oil filled for lubricating the interfaces between first slide member 64 and second slide member 66 as well as the interface between the slide members and eccentric crank portion 16 of stationary crank 14. In addition, the oil lubricates radially disposed arms 78 through 92 as they move in and out of openings 112 through 126.

As further seen in FIG. 11 of the drawings, square rectangular body member 98 is constructed from four rectangular body plates 128, 130, 132 and 134 of substantially equal size affixed to each other in a substantially rectangular configuration so as to form a hollow box having open proximal end 104 and open distal end 106.

In the embodiment shown in FIG. 1, the four pairs of cylinders 22, 28, 34 and 40 are connected to housing 18 and are quadrilaterally disposed from each other. By this it is meant the two pairs of cylinders are positioned on each side of body member 98. Each of the cylinders contain one of the pistons 46 through 60. However, alternate configurations of cylinders such as two pairs of cylinders with one cylinder on each side may be utilized to accomplish the same balanced array of force and weight vectors.

As best seen in FIG. 11 of the drawings, slide member 64 has two pair of arms, 78 through 84, in opposed sets so that each arm is laterally opposed to and coaxial with an opposed arm. For example, arm 78 is laterally opposed and coaxially with opposed arm 80. Similarly, second slide member 64 has two pair of opposed arms 86 through 92 which are also disposed in opposed sets that each arm is laterally opposed and coaxially with an opposed arm. As a result, slide members 64 and 66 are substantially H-shaped in configuration. This H-shape configuration is uniformly balanced so that in the case of slide member 64, reciprocal movement of pistons 44 through 52 creates a first force vector 228 and a third opposite force vector 232 which are distributed evenly across the width of housing 98, thereby balancing the reciprocating motion of piston members 46 through 52 and thus preventing a wobble of housing 18 during rotation. Similarly, second slide member 66 has arms 86 through 92 extending laterally therefrom in opposed sets so as to form an H-shape configuration. As a result, second slide member 66 moves in second force vector 230 and fourth opposite force vector 234 which are uniformly distributed across the width of body member 98. A balanced wobble free rotation of housing 18 is thereby produced.

A key feature of the invention and a major improvement over the prior art is the construction of external valve means 68. In the embodiments shown in FIG. 1, external valve means 68 includes shuttle valve members 136, 138, 140 and 142 radially disposed and extending from the periphery of housing 18. Each of shuttle valve members 136 through 142 contains a plurality of ports such as ports 144, 146 and 148 as seen in FIGS. 4 and 5 which selectively permit the passage of fluid pressure through shuttle valve members 136 through 142 to a selected one of the cylinders 24, 26, 30, 32, 36, 38, 42 and 44, or, alternately the venting of fluid pressure from one of the aforesaid cylinders, as more fully described hereafter.

Each shuttle valve contains a single shuttle valve piston as best seen in FIG. 3. Shuttle valve 136 contains shuttle valve piston 150. Shuttle valve 138 contains shuttle valve piston 152. Shuttle valve 140 contains shuttle valve piston 154. Shuttle valve 142 contains shuttle valve piston 156. Shuttle valve 150 through 156 are slideably contained within shuttle valve member 136 through 142. By this is meant that the outside diameter of shuttle valve pistons 150 through 156 is substantially the same as but slightly smaller than the inside diameter of shuttle valves 136 through 142. As conventional in the art, pairs of rings such as shuttle valve rings 158 and 160 may be disposed around the shuttle valve piston 150 so as to seal the shuttle valve piston 150 within shuttle valve 142, while at the same time allowing slidable movement of shuttle valve piston 150 within shuttle valve 136. As further seen in FIG. 3, shuttle valve pistons 150 through 156 extend from and are connected to, respectively, shuttle valve piston arms 162 to 164, 166 and 168. Shuttle valve piston arm 162 has shuttle valve piston 150 attached to its distal end and first slide member 64 attached to its proximal end. Shuttle valve piston arm 162 also extends through aperture 170 in housing 18. Aperture 170 contains a seal 172 about shuttle valve piston arm 162 which allows slidable movement of the piston arm, but seals the interior of housing 18. Oppositely disposed from shuttle valve piston arm 162 is shuttle valve piston arm 166 which is attached at its distal end to shuttle valve piston 154 and is attached at its proximal end to first slide member 64. Shuttle valve piston arm 166 extends through aperture 174 having seal 176 contained therein. Normal to shuttle valve piston arms 162 and 166 is shuttle valve piston arm 164 which extends through aperture 174 in housing 18 and is sealed by seal 176 which prevents leakage from the interior housing 18, but allows slidable movement of piston arm 166. Oppositely disposed from shuttle valve piston arm 164 is shuttle valve piston arm 168. Shuttle valve piston arms 164 and 168 are connected to second slide member 66 at their proximal end, and to shuttle valve pistons 152 and 156 respectively at their distal ends. Shuttle valve piston arm 168 extends through aperture 177 having seal 179 contained therein which prevents leakage of oil from the interior of housing 18.

Thus, as first slide member 64 reciprocates towards first body plate member 128 and third body plate member 132, shuttle valve pistons 150 and 154 reciprocate within shuttle valves 136 and 140 so that ports 144, 146 and 148 are sequentially opened and closed. (Best seen in FIG. 4). Port 144 is connected to a source of fluid pressure. Port 146 is connected to, for example, cylinder 38 at its distal end and cylinder 36 at its proximal end. Thus, when shuttle valve piston 150 is positioned so as to close port 144, fluid pressure contained within cylinders 30 and 44 is allowed to pass through port 146, shuttle valve 136 and out of port 148. Conversely, when shuttle valve piston 150 is positioned so as to close port 148, fluid under pressure is allowed to pass through port 144 into shuttle valve 150 and out of port 146 and into the proximal end of cylinder 30 and the distal end of cylinder 44, thus driving pistons 60 and 50, respectively, toward third plate 132 and away from second plate 130. (i.e. in the direction of third force vector 232). The sequence of opening and closing the shuttle valves will be described further herein.

In order to actuate rotary hydraulic engine 10, a source of hydraulic pressure; i.e. fluid under pressure or fluid pressure must be provided. Examples of such sources of fluid under pressure include a tank of compressed air 178 such as seen in FIG. 1 connected to engine 10 by means of a fluid pressure line 180. Alternately, where available, a flexible fluid pressure line 180 may be connected to a source of hydraulic pressure such as a pressure line common to many industrial settings.

As further seen in FIG. 3 of the drawing, first shuttle valve member 136 is connected through port 146 by means of flexible tubing 182 to proximal end 184 of fifth cylinder 36 and proximal end 186 of seventh cylinder 42. Flexible tubing 182 is also connected to distal end 188 of sixth cylinder 38 and distal end of 190 of eighth cylinder 44. Second shuttle valve 138 is connected through port 192 through flexible tubing 194 to proximal end 196 of second cylinder 26 and proximal end 198 of fourth cylinder 32. Flexible tubing 194 is also connected to distal end 200 of first cylinder 24 and distal end 202 of third cylinder 30. Third shuttle valve 140 is connected through port 204 and flexible tubing 206 through proximal end 208 of sixth cylinder 38 and proximal end 210 of eighth cylinder 44. Flexible tubing 206 is also connected to distal end 212 of fifth cylinder 36 and distal end 214 of seventh cylinder 42. A fourth shuttle valve 142 is connected to and in fluid communication with port 216 and flexible tubing 218 to the proximal end 220 of first cylinder 24, the proximal end 222 of third cylinder 30, the distal end of 224 of second cylinder 26 and the distal end 226 of fourth cylinder 32. As a result, fluid under pressure may be supplied in sequence to the aforesaid cylinders so as to sequentially propel the pistons thereby imparting rotary motion to the housing.

Generally, as seen in FIGS. 4 and 5, the shuttle valves are so designed that when the shuttle valve piston 136 is in the upper end of the shuttle valve, the lower port 144 of the shuttle valve is in fluid communication with the central port 146. When the shuttle valve piston 136 is in the lower portion of the shuttle valve, the upper port 148 is in communication with the central port 146.

As seen in FIGS. 2 and 6 in the preferred form of the invention, the outer ends of each of the shuttle valves are connected in a manifold (fluid passageway 252) at one hub 236. The inner ends of the shuttle valves are connected to a second manifold (fluid passageway 253) at the opposite hub 250. The middle ports 146 of each shuttle valves are connected to the cylinders as enumerated above. If the pressure is greater at hub 236 than at the other 250, the shuttle valves alternately connect each pair of cylinders first to the high pressure manifold for 180 degrees of rotation and to the low pressure manifold for 180 degrees of rotation.

As the machine is rotated the valve timing is such that such cylinder is in fluid communication with one hub during the apparent outward travel of the piston and with the other hub during its apparent inward travel. Pressure is thus smoothly transmitted from one hub to the other when the machine is rotated. If the direction of the rotation is reversed these relationships are reversed and the flow is from the second hub to the first. The aforesaid connections are by no means the only series in which the shuttle valves may be connected to the cylinders, but rather are one sequence adapted for the construction of the rotary engine shown in FIG. 3.

In operation, during a first portion of the sequential reciprocation of rotary engine 10, fourth shuttle valve 142 concurrently supplies fluid under pressure through flexible tubing 218 to proximal end 220 of first cylinder 24 and proximal end 222 of third cylinder 30, and to distal end 224 of second cylinder 26 and distal end 226 of fourth cylinder 32. As a result, pistons 46, 48, 50 and 52 are propelled in a first force vector 228.

During the second portion of the sequential reciprocation of the pistons within rotary engine 10, first shuttle valve member 136 supplies fluid under pressure through port 146 and flexible tubing 182 to the proximal end 184 of fifth cylinder 36 and the proximal end 186 of seventh cylinder 42. Flexible tubing 182 also supplies fluid under pressure to distal end 188 of sixth cylinder 38 and the distal end 190 of eighth cylinder 44. As a result, pistons 54, 56, 58 and 60 are propelled in a second force vector 230 which is at right angles to first force vector 228. During a third portion of the sequential reciprocation of the pistons, second shuttle valve member 138 concurrently supplies fluid under pressure through port 192 and flexible tubing 194 to the distal end 200 of first cylinder 24 and the distal end 202 of third cylinder 30. Flexible tubing 194 also supplies fluid under pressure to the proximal end 196 of second cylinder 26 and the proximal end 198 of fourth cylinder 32 so that pistons 46, 48, 50 and 52 are propelled in a third force vector 232 opposite to that of first force vector 228. During a fourth portion of the sequential reciprocation of the pistons, third shuttle valve 140 concurrently supplies fluid under pressure through ports 204 and flexible tubing 206 to the distal ends 212 of fifth cylinder 36 and distal end 214 of seventh cylinder 42 and to the proximal end 208 of sixth cylinder 38 and the proximal end 210 of eighth cylinder 44, so that pistons 54, 56, 58 and 60 are propelled in a fourth force vector 234 opposite to that of second force vector 230. It should be noted in this regard, however, that the aforesaid first through fourth portions of the sequential reciprocation do not occur individually, but rather overlap each other so as to impart a rotary motion to housing 18. In point of fact, pistons 46, 48, 50 and 52 move in first force vector 228, pause during the period of time in which eccentric crank portion 16 slides along longitudinal first slot 94 and then move in third opposite force vector 232. This pause during the motion of the pistons prevents piston slap, common to many internal combustion engines which greatly increases wear and vibration to the engine. As a result, extremely long piston arms such as 78, 80, 82 and 84 may be used. During the movement of pistons 46, 48, 50 and 52 in first force vector 228, pistons 54, 56, 58 and 60 are completing their movement in the second force vector 230, pause, and begin to move in fourth force vector 234. Similarly, while pistons 54, 56, 58 and 60 are moving in second force vector 230, pistons 46, 48, 50 and 52 move in first force vector 228, pause during the period in which eccentric crank portion 16 is moving along first slot 94 and then begin to move in third force vector 232. During the pause in movement of second slide member 66 between second force vector 230 and fourth force vector 234 eccentric crank portion 16 moves longitudinally along second slot member 96. The pump stroke of each piston sequentially overlaps the one 90 degrees prior to itself in rotation, then is sequentially overlapped by the one 90 degrees behind it in rotation.

As best seen in FIG. 2 of the drawings, rotary hydraulic engine 10 includes a hub 236 rotatably mounted on crankshaft 14 and connected to housing 18. A hose coupling 238 is fixedly positioned relative to crankshaft 14 and is in fluid communication with hub 236. In the embodiment shown, hose coupling 238 is fixedly attached to first end 240 of crankshaft 14. Hose coupling 238 is in fluid communication with hub 236 so as to selectively permit the passage of fluid under pressure to and from hub 236. Flexible tubing 242 is connected to and provides fluid communication between hub 236 and first shuttle valve 136. Flexible tubing 244 is connected to hub 236 and to second shuttle valve 138 so as to provide fluid communication therebetween. Flexible tubing 246 is connected to hub 236 and third shuttle valve 140 so as to provide fluid communication therebetween. Flexible tubing 248 is connected to hub 236 and to fourth shuttle valve 142 so as to provide fluid communication therebetween. Thus, when fluid under pressure is admitted through hose coupling 238 and into hub 236, the fluid pressure passes to shuttle valves 136, 138, 140 and 142 as required. Passage of the fluid under pressure is controlled by the shuttle valves being opened or closed.

As seen in FIGS. 6 and 6A of the drawings, rotary hydraulic engine 10 includes a second hub 250 oppositely disposed from first hub 236 and extending substantially perpendicularly from rear plate 110. First hub 236 extends substantially perpendicularly from front plate 108. Hub members 236 and 250, although rotatably mounted, are in substantial sealing relationship with stationary crankshaft 14. Hub members 236 and 250 have a fluid passageways 252 and 253 respectively extending therethrough which are juxtaposed to crankshaft 14. Fluid passageways 252 and 253 are manifolds in hubs 236 and 250. Fluid passageway 252 extends through hub member 250 to flexible tubing members 254, 256, 258 and 260. As seen in FIG. 6A, a plurality of ports 262 are formed in crankshaft 14 and ports 262 are juxtaposed to fluid passsageways 252. Ports 262 are connected to lumen 264 extending through crankshaft 14 from first end 240. Similarly, as seen in FIG. 6, crankshaft 14 has a lumen 268 extending inwardly therethrough from second end 270 of crankshaft to ports 272 which are adapted to permit fluid flow into hub member 236.

Pressure may be selectively passed through hose coupling 238 at first end 240 of crankshaft 14, through lumen 264, through ports 262, into fluid passageways 252, through hub 236, through lengths of flexible tubing 242, 244, 246, and 248 and into respective shuttle valve members 136, 138, 140 and 142 for driving the pistons of the engine. Subsequent to such motion, fluid under pressure may be vented from the cylinders into shuttle valve members 136, 138, 140 and 142 through lengths of tubing 254, 256, 258 and 260 and into hub 250. Once in hub 250, the vented pressure is passed through fluid passageways 253, through ports 272 in crankshaft 14, through lumen 268 and out hose coupling 276.

Alternatively, fluid under pressure may be directed through hose coupling 276, through lumen 268, through ports 272, through flexible tubing 254, 256, 258 and 260 and into shuttle valve members 136, 138, 140 and 142. The fluid under pressure is then utilized to drive rotary engine 10 in a second opposite direction 278 to first direction 280 previously described. Fluid under pressure is then exhausted from the cylinders through shuttle valves 136, 138, 140 and 142, through flexible tubing 242, 244, 246 and 248 through hub 236, through fluid passageway 252, through ports 262, into lumen 264 and out of hose coupling 238. As a result, rotation of rotary engine 10 may be directed as desired through the application of fluid pressure to the hose coupling 238 or hose coupling 276 as required.

In one embodiment of the invention shown in FIG. 13, the interior 99 of housing 18 has a plurality of apertures in fluid communication with the cylinders. Fluid under pressure is admitted to the cylinders in the manner previously described. However, instead of exhausting the fluid under pressure from the cylinders through tubes 254, 256, 258 and 260, the fluid under pressure is exhausted directly through housing 18 into hub 250 and out of crankshaft 14 through lumen 268. Also shown in FIG. 13 are central ports 146, 192, 204 and 216. These ports are connected by means of flexible tubing to the respective cylinders previously described on page 15 and shown in FIG. 3. Thus, because each shuttle valve sequentially opens and closes at its respective ends, air is sequentially vented to each of the cylinders which drive the engine. The cylinders in turn propel the pistons contained therein which causes housing 18 to rotate about the crankshaft 14. When the shuttle valves are in a position to vent accumulated pressure, they vent the pressure directly into the interior 99 of housing 18, through lumen 268 and out hub 250. Alternatively, fluid under pressure may be admitted directly into shuttle valves 136, 138, 140 and 142 from hose coupling 238, through hub 236, into housing 18 and from there to the external valve means. Venting of the cylinders would then take place as shown in FIG. 6. An additional alternative is to include a separate fluid passageway within housing 18 which would allow the fluid to be passed into shuttle valves 136, 138, 140 and 142 from housing 18 and then fluid under pressure vented from the cylinders through the shuttle valves and through a second passageway in housing 18.

Returning to FIG. 1 of the drawings, as previously mentioned, when housing 18 rotates in first direction 280, air is drawn into external valve mechanism 68, is compressed in cylinders 24, 26, 30, 32, 36, 38, 42 and 44 and is driven through flexible pressure line 180 to compressed air tank 178. Included in pressure line 180 is a switching valve 282 which in a first position allows compressed air from housing 18 to pass therethrough into tank 178, but which acts as a check valve to prevent compressed air from passing back up through flexible pressure line 180 when housing 18 is not rotating. When switching valve 282 is switched to a second position, compressed air within tank 178 is allowed to pass through flexible pressure line 180 and into external valve mechanism 78 thereby providing fluid under pressure necessary to drive engine 10. Housing 18 is thereby caused to rotate in second opposite direction 278. As a result, rotary hydraulic engine may be utilized as a compressor for compressing compressed air into a tank and thereafter selectively used as a rotary engine driven by the compressed air in tank 178.

As best seen in FIG. 9, in one embodiment of the invention, the previously mentioned external apparatus to which belt 74 is movably connected comprises a windmill 284. Drive pulley 76 on windmill 284 includes a slip gear 286 with a switching mechanism 288. Thus, in a first mode, windmill 284 is driven by the wind which causes rotation of slip gear 286, thereby rotating drive pulley 76 so as to cause rotation of housing 18 by means of belt 74 rotating pulley 72. This rotation of housing 18 causes compression of air in the cylinders which in turn drives the compressed air into a holding tank 178. When a desired quantity of air has been stored or the capacity of tank 178 is met, switching mechanism 288 is activated thereby releasing slip gear 286 so that further rotation of windmill 284 does not cause rotation of housing 18. Thereafter, when use of rotary hydraulic engine is desired, switching valve member 282 is placed in a second position so as to cause compressed air from tank 178 to pass into external valve mechanism 68 thereby effecting rotation of housing 18 in second direction 278.

As further seen in FIG. 9, pulley 72 may have second pulley 290 attached to housing 18 and rotatable about crankshaft 14. Second pulley 290 in turn has a belt 292 which is mounted on second drive pulley 294 of water pump 296. Water pump 296 also has a switching mechanism 298 connected to second drive pulley 294. As a result, when switching mechanism 298 is in the first mode, rotation of housing 18 causes rotation of second pulley 290 which transmits rotary force through belt 292 to second drive pulley 294. Thereafter, when switching mechanism 298 is placed into a second mode, a slip gear 300 connected to second drive pulley 294 is activated thereby releasing second drive pulley 294 so that rotation of housing 18 does not cause driving of water pump 296. As a result, when used for irrigating a field, windmill 284 may be used for rotating housing 18 so as to store compressed air in tank 178. When irrigation of a field is required, switching mechanisms 288 and 298 are activated so that the compressed air in tank 178 causes rotation of housing 18, thereby rotating the second pulley 290, which moves belt 292 so as to rotate second drive pulley 294, thereby driving water pump 296. Water pump 296 in turn draws water to irrigate the field. It should be noted in this regard that, ordinarily, when switching mechanism 288 is in a first mode, switching mechanism 298 is in a second mode so that the energy from windmill 284 is being used to store compressed air in the first mode and then later being used to drive rotary engine 10 which in turn drives water pump 296 in a second mode. Thus, rotary hydraulic engine 10 may be selectively utilized to store energy in the form of compressed air, and the energy later utilized to selectively pump water. In this regard, because of the placement of the cylinders and the external valve mechanism on the outside of the housing, and because of the use of air-tight seals, rotary hydraulic engine 10 may, in fact, actually be utilzed for pumping water itself, if desired. However, this would require the use of two rotary hydraulic engines 10 since a single engine would not be able to both pump water and have the cylinders driven by compressed air. It is, of course, within the scope of the invention to include cylinders specifically directed for compressing air and other cylinders directed to pumping water in which a single engine could be utilized for both purposes.

In one embodiment of the invention as seen in FIG. 12, since rotary hydraulic engine 10 is a compressor, it may be utilized as a heat pump. In such an embodiment, a condensor 302 is used for condensing a compressed gas such as freon into a liquid. Condensor 302 is in fluid communication with hose coupling 238 and tank 178 and is interposed therebetween. An evaporator 304 is positioned on the opposite side of tank 178 and is connected to hose coupling 276. In one direction of flow, heat created by the condensation of liquid in condensor 302. In the other direction, cold is created by the evaporation of the liquid in evaporator 304. Heat may be selectively pumped thereby. Thus, as previously mentioned, the rotary hydraulic engine of the present invention may be used as an air compressor, a liquid pump, a heat pump or the like.

Turning now to FIG. 7, in one embodiment of the invention, rotary hydraulic engine 10 has a first pair of cylinders 22 and second pair of cylinders 28 normally disposed to each other and quadrilaterally disposed relative to housing 18. As previously mentioned, first pair of cylinders 22 includes first cylinder 24 and second cylinder 26. Second pair of cylinders 28 includes third cylinder 30 and fourth cylinder 32. Also radially disposed from housing 18 are shuttle valves 136, 138, 140 and 142. As in the embodiment shown in FIG. 1, compressed air is admitted through hub 236 through flexible tubing 242, 244, 246 and 248 to the distal ends of shuttle valves 136, 138, 140 and 142, respectively. First shuttle valve member 136 is connected by means of flexible tubing 182 to the proximal end 202 of third cylinder 30 and to the distal end 226 of fourth cylinder 32. Second shuttle valve 138 is connected by means of flexible tubing 194 to the distal end 200 of first cylinder 24 and to the proximal end 196 of second cylinder 26. Third shuttle valve 140 is connected by means of flexible tubing 206 to the proximal end 198 of fourth cylinder 32 and to the distal end 222 of third cylinder 30. Fourth shuttle valve 142 is connected to and in a fluid communication through flexible tubing 218 to the proximal end 184 of first cylinder 24 and to the distal end 224 of third cylinder 26. As a result of this configuration, fluid under pressure is sequentially supplied to the proximal and distal ends of the opposed cylinders so as to cause reciprocation of the pistons contained therein, thereby affecting rotation of housing 18.

As best seen in FIG. 8, first slide member 64 again is in an H-shaped configuration having arms 78 and 80 extending therefrom into first cylinder 24 and second cylinder 26. Again, pistons 46 and 48 are disposed in first cylinder 24 and second cylinder 26, respectively. Again, shuttle valve piston 150 is disposed in first shuttle valve 136 and third shuttle valve piston 156 is disposed in third shuttle valve 140. Shuttle valve piston 150 is mounted on arm 162 which extends between piston 150 and first slide member 64. Shuttle valve piston 156 is mounted on shuttle valve piston arm 166 which extends to the opposite side of first slide member 64. As a result, when fluid under pressure is supplied to shuttle valves 136 and 140, pistons 46 and 50 reciprocate between a first force vector 228 and a third opposite force vector 232. Similarly, shuttle valve pistons 150 and 156 move in tandem with first slide member 64.

Second slide member 66 is mounted below, but on a plane parallel with first slide member 64. Second slide member 66 has arm 80 extending to piston 48 which is slidingly disposed within third cylinder 30. Oppositely disposed from and coaxial with arm 80 and piston 48 is arm 84 and piston 52 disposed on the end thereof in cylinder 32. Arm 84 is connected to and extends from second slide member 66. Shuttle valve piston arm 164 extends to shuttle valve piston 152 which is slideably mounted within second shuttle valve 138. Oppositely disposed from and coaxial with shuttle valve piston 152 is shuttle valve piston arm 168 which extends to shuttle valve piston 156 in shuttle valve 142. Again, pistons 48, 52, and shuttle valve pistons 152 and 156 reciprocate between second force vector 230 and fourth force vector 234 about eccentric crank portion 16 of crankshaft 14. As a result of this sequential reciprocation of the pistons, housing 18 is caused to rotate.

One sequence for actuating the aforesaid pistons is supplying, in the first portion of the sequence, fluid under pressure to the proximal end 220 of first cylinder 24 and the distal end 224 of second cylinder 26. Pistons 46 and 50 are thus moved in a first force vector 228. During the second portion of the sequence, fluid under pressure is supplied to distal end 226 of fourth cylinder 32 and proximal end 222 of second cylinder 30 so as to move pistons 48 and 52 in a second force vector 230. During a third portion of the sequence, fluid under pressure is supplied to the distal end 200 of first cylinder 24 and the proximal end 196 of second cylinder 26 so as to move pistons 46 and 50 in a third force vector 232 opposite to that of first force vector 228. During a fourth portion of the sequence, the fluid under pressure is supplied to the distal end 202 of third cylinder 30 and to the proximal end 198 of fourth cylinder 32 so as to move pistons 48 and 52 in a fourth force vector 234 opposite to that of second force vector 230. As previously mentioned, the aforesaid portions of the sequence are not isolated, but rather overlap each other as first slide member 64 reciprocates within housing 18 about eccentric crank portion 16 and as second slide member 66 also reciprocates within housing 18. Specifically, eccentric crank portion 16 is moving in longitudinal slots 94 and 96 so as to control the timing of the sequence. Each slide member 64 and 66 moves to one side of housing 18, pauses for a portion of its sequence and then begins to return to the other side of the housing while the opposite slide is moving. Each piston moves in sequence following the piston 90 degrees before it. For example, the rotary hydraulic engine of FIG. 1 may be seen in FIG. 10 in which first slide 64 and second slide member 66 are shown in a second portion of the aforesaid sequence.

First slide member 64 is best seen in FIG. 11, having pistons 46, 48, 50 and 52 attached thereto on arms 78, 80, 82 and 84. Second slide member 66 is ordinarily identical to first slide member 64, but disposed parallel to and below it. Arms 86, 88, 90 and 92 extend radially from second slide member 66, and are normal to arms 78, 80, 82 and 84. Housing 18 is also shown in FIG. 11 with a specific illustration of first plate 128, second plate 130, third plate 132, fourth plate 134, front plate 108 and rear plate 110. Ordinarily, housing 18 is constructed of metallic plates which are either bolted or welded together so as to provide a hermetic seal. Rotary engine 10 is generally constructed of commonly known metals utilized in engine construction. However, since little heat is created in the operation of the device, light weight metal such as aluminum may be utilized without fear of damage. Seals 158 and 160 and other seals utilized in the device again use commonly known materials such as silicone rubber rings or special metallic oxides for providing air-tight seals while at the same time lubricating the movement of the respective pistons within the cylinders. The flexible tubing described in the application may be polyvinyl chloride, polyethylene or other commonly known materials. Frame 12 is preferably constructed of a high strength metal such as steel, as is crankshaft 14. Ordinarily, first slide member 64 and second slide member 66 include roller bearings 306 and 308 which lubricate their movement about eccentric crank portion 16.

While the embodiments of rotary hydraulic engine 10 described herein utilize a housing 18 which rotates about a stationary crankshaft 14, it is within the scope of the invention to revise this arrangement so as to provide a stationary housing 18 and a rotatable crankshaft 14. In such an embodiment, crankshaft 14 would interface with a gearing mechanism formed as a part of transmission 70.

The foregoing description and drawings merely explain and illustrate the invention and the invention is not so limited thereto except insofar as the those who have the disclosure before them are able to make modifications and variations therein without departing from the scope of the invention.

LIST OF PARTS FOR PATENT APPLICATION ROTARY HYDRAULIC ENGINE 10. rotary hydraulic engine
12. frame
14. crankshaft
16. eccentric crank portion
18. housing
20. plurality of pair cylinders
22. first pair cylinders
24. first cylinder
26. second cylinder
28. second pair of cylinders
30. third cylinder
32. fourth cylinder
34. third pair of cylinders
36. fifth cylinder
38. sixth cylinder
40. fourth pair of cylinders
42. seventh cylinder
44. eighth cylinder
46. first piston
48. second piston
50. third piston
52. fourth piston
54. fifth piston
56. sixth piston
58. seventh piston
60. eighth piston
62. scotch yoke assembly
64. first slide member
66. second slide member
68. external valve means
70. transmission mechanism
72. pulley
74. belt drive
76. drive pulley
78. arm
80. arm
82. arm
84. arm
86. arm
88. arm
90. arm
92. arm
94. first slot
96. second slot
98. square body member
99. hollow interior
100. opening in 98
102. opening in 98
104. proximal end of 98
106. distal end of 98
108. front plate
110. rear plate
112. openings in periphery of 98
114. openings in periphery of 98
116. openings in periphery of 98
118. openings in periphery of 98
120. openings in periphery of 98
122. openings in periphery of 98
124. openings in periphery of 98
126. openings in periphery of 98
128. first plate
130. second plate
132. third plate
134. fourth plate
136. first shuttle valve
138. second shuttle valve
140. third shuttle valve
142. fourth shuttle valve
144. ports
146. ports
148. ports
150. shuttle valve piston
152. shuttle valve piston
154. shuttle valve piston
156. shuttle valve piston
158. ring
160. ring
162. shuttle valve piston arm
164. shuttle valve piston arm
166. shuttle valve piston arm
168. shuttle valve piston arm
170. aperture
172. seal
174. aperture
176. seal
177. aperture
178. tank of compressed air
179. seal
180. pressure line
182. tubing
184. proximal end of 36
186. proximal end of 42
188. distal end of 38
190. distal end of 44
192. port in 138
194. flexible tubing
196. proximal end of 26
198. proximal end of 32
200. distal end 24
202. distal end 30
204. port in 140
206. flexible tubing
208. proximal end of 38
210. proximal end of 44
212. distal end of 36
214. distal end of 42
216. port in 42
218. flexible tubing
220. proximal end of 24
222. proximal end of 30
224. distal end 26
226. distal end of 32
228. first force vector
230. second force vector
232. third force vector
234. fourth force vector
236. hub
238. hose coupling
240. first end of crankshaft 14
242. flexible tubing
244. flexible tubing
246. flexible tubing
248. flexible tubing
250. second hub
252. fluid passageway
253. fluid passageway
254. flexible tubing
256. flexible tubing
258. flexible tubing 260. flexible tubing
262. ports
264. lumen
268. lumen
270. second end of crankshaft 14
272. port
274. fluid passageway
276. hose coupling
278. second direction
280. first direction
282. switching valve member
284. windmill
286. slip gear
288. switching mechanism
290. second pulley
292. belt
294. second drive pulley
296. water pump
298. switching mechanism
300. slip gear
302. condensor
304. evaporator
306. roller bearings
308. roller bearings

What is claimed is

1. A rotary hydraulic engine comprising, in combination;
   frame means;
   crankshaft means supported by said frame means in substantially fixed relation therewith and having an eccentric crank portion;
   housing means encircling said crankshaft means and being rotatable relative thereto, said housing means defining a plurality of pairs of cylinders disposed in laterally opposed sets such that each cylinder is laterally opposed to and co-axial with an opposed cylinder;
   a piston slidingly disposed within each of said cylinders;
   a scotch yoke assembly having a pair of discrete slide members each of which interconnects the pistons disposed within said laterally opposed sets of cylinders and has cooperative relation with said eccentric crank portion so as to effect tandem movement of said interconnected pistons and thereby effect relative movement between said housing means and said crankshaft means;
   external valve means operatively associated with each of said cylinders so as to enable selective application of fluid pressure to said pistons in a manner adapted to effect predetermined sequential movement of said pistons and associated scotch yoke assembly, thereby imparting rotary motion to said housing;
   means operatively associated with said housing means so as to enable transfer of the rotary motion of said housing means to an external apparatus;
   a plurality of shuttle valve members radially disposed and extending from the periphery of said housing, each of said shuttle valve members containing a plurality of ports for selectively permitting the passage of said fluid pressure through a shuttle valve member to a selected one of said cylinders, and for the venting of said fluid pressure from a selected other one of said cylinders through a shuttle valve member; and
   a shuttle valve piston slideably contained within each of said shuttle valve members, said shuttle valve pistons being connected to a shuttle valve piston arm, which in turn is connected to said one of said slide members of said scotch yoke assembly so that each of said shuttle valve pistons reciprocates in tandem with the slide member to which it is connected, thereby sequentially opening or closing selected ones of said plurality of ports within said shuttle valve member, whereby said fluid pressure is selectively directed to or from said pistons, as required.

2. The rotary hydraulic engine of claim 1 wherein said first slide member and said second slide member with said arms extending therefrom are each substantially H-shaped in configuration so as to connect said pistons in a precisely balanced array of weights and force vectors rotating around said axis of said crank shaft whereby the rotation of the mass of the pistons and housing acts as a flywheel.

3. A rotary hydraulic engine comprising, in combination:
   frame means;
   crankshaft means supported by said frame means in substantially fixed relation therewith and having an eccentric crank portion;
   housing means encircling said crankshaft means and being rotatable relative thereto;
   said housing means defining a plurality of pairs of cylinders disposed in laterally disposed sets such that each cylinder is laterally opposed to and coaxial with an opposed cylinder;
   a piston slidingly disposed within each of said cylinders;
   a scotch yoke assembly having a pair of discrete slide members each of which interconnects the pistons disposed within said laterally opposed sets of cylinders and has cooperative relation with said eccentric crank portion so as to effect tandem movement of said interconnected pistons and thereby effect relative movement between said housing means and said crankshaft means;
   external valve means operatively associated with each of said cylinders so as to enable selective application of fluid pressure to said pistons in a manner adapted to effect predetermined sequential movement of said pistons and associated scotch yoke assembly, thereby imparting rotary motion to said housing;
   means operatively associated with said housing means so as to enable transfer of the rotary motion of said housing means to an external apparatus;
   said plurality of pairs of cylinders comprising four pair of cylinders connected to said housing, quadrilaterally disposed from each other and positioned so as to provide two cylinders on each side of said housing;
   each of said cylinders containing a respective one of said pistons, said pistons being connected by arms extending from said slide members so as to reciprocate in tandem when propelled by a fluid under pressure;
   a plurality of shuttle valve members radially disposed and extending from the periphery of said housing, each of said shuttle valve members containing a plurality of ports for selectively permitting the passage of said fluid pressure through said shuttle valve member to a selected one of said cylinders, or alternatively for the venting of said fluid pressure from a selected other one of said cylinders; and a plurality of shuttle valve pistons slidably contained within respective ones of said shuttle valve members, each of said shuttle valve pistons further being connected to a respective shuttle valve piston arm, which in turn is connected to one of said slide members of said scotch yoke assembly so that each of said shuttle valve pistons reciprocates in tandem with the slide member to which it is connected, thereby sequentially opening or closing selected ones of said plurality of ports, whereby said hydraulic fluid is selectively directed to or from said pistons, as desired.

4. A rotary hydraulic engine comprising:
a stationary crank shaft having an eccentric crank portion disposed thereon;
a housing rotatable about said crankshaft;
four pairs of cylinders connected to said housing and quadrilaterally disposed thereon, each of said cylinders being oppositely disposed from its pair;
four pairs of pistons slidingly disposed within said four pairs of cylinders, and oppositely disposed from each other, each of said cylinders containing a respective piston, and each of said pairs of pistons being connected so as to move in tandem when propelled by a fluid under pressure;
hydraulic pressure means for providing said fluid under pressure to said four pairs of cylinders;
external valve means connected to said four pairs of cylinders for selectively permitting the passage of said fluid under pressure, thereby sequentially actuating said four pairs of pistons;
a scotch yoke assembly for integrating the motion of said four pairs of pistons, said scotch yoke assembly comprising a first slide member having arms connecting said first and second pairs of pistons and a second slide member having arms connecting said third and fourth pairs of pistons;
said first and second slide members having respectively first and second slots therein disposed at right angles to each other and adapted for reception of said eccentric crank portion of said stationary crank shaft, whereby said motion of said four pairs of pistons is integrated by the interaction of said eccentric crank portion with said first and second slots, thereby effecting sequential reciprocation of said four pairs of pistons, said sequential reciprocation of said four pairs of pistons in turn imparting a rotary motion to said housing;
transmission means for conveying said rotary motion of said housing to a selected external apparatus, as desired; and
wherein said crankshaft contains a lumen extending therethrough and said cylinders are in fluid communication with said interior of said housing and said lumen of said crankshaft whereby said fluid under pressure may be selectively passed from said interior of said housing, and into said cylinder or conversely, said fluid under pressure may be drawn from said cylinders and passed into said interior of said housing and out said lumen of said crankshaft.

5. A rotary hydraulic engine comprising;
a stationary crank shaft having an eccentric crank portion disposed thereon;
a housing rotatable about said crankshaft;
four pairs of cylinders connected to said housing and quadrilaterally disposed thereon, each of said cylinders being oppositely disposed from its pair;
four pairs of pistons slidingly disposed within said four pairs of cylinders, and oppositely disposed from each other, each of said cylinders containing a respective piston, and each of said pairs of pistons being connected so as to move in tandem when propelled by a fluid under pressure;
a tank of compressed air for providing said fluid under pressure to said four pairs of cylinders;
external valve means connected to said four pairs of cylinders for selectively permitting the passage of said fluid under pressure, thereby sequentially actuating said four pairs of pistons;
a scotch yoke assembly for integrating the motion of said four pairs of pistons, said scotch yoke assembly comprising a first slide member having arms connecting said first and second pairs of pistons and a second slide member having arms connecting said third and fourth pairs of pistons;
said first and second slide members having respectively first and second slots therein disposed at right angles to each other and adapted for reception of said eccentric crank portion of said stationary crank shaft, whereby said motion of said four pairs of pistons is integrated by the interaction of said eccentric crank portion with said first and second slots, thereby effecting sequential reciprocation of said four pairs of pistons, said sequential reciprocation of said four pairs of pistons in turn imparting a rotary motion to said housing;
transmission means for conveying said rotary motion of said housing to a selected external apparatus, as desired; and
a windmill constructed and arranged for driving said engine and selectively engageable therewith, thereby effecting rotation of said housing in a first direction so as to pump said compressed air into said tank, whereby said improved rotary engine may be selectively utilized to store energy in the form of compressed air in a first mode and to utilize said stored energy to drive said engine in a second mode.

6. The rotary hydraulic engine of claim 5 wherein said external apparatus further comprises;
a water pump constructed and arranged to selectively irrigate crops when driven by said housing rotating in said second direction.

7. A rotary hydraulic engine comprising:
a stationary crank shaft having an eccentric crank portion disposed thereon:
a housing rotatable about said crankshaft;
four pairs of cylinders connected to said housing and quadrilaterally disposed thereon, each of said cylinders being oppositely disposed from its pair;
four pairs of pistons slidingly disposed within said four pairs of cylinders, and oppositely disposed from each other, each of said cylinders containing a respective piston, and each of said pairs of pistons being connected so as to move in tandem when propelled by a fluid under pressure;
hydraulic pressure means for providing said fluid under pressure to said four pairs of cylinders;
external valve means connected to said four pairs of cylinders for selectively permitting the passage of said fluid under pressure, thereby sequentially actuating said four pairs of pistons;
a scotch yoke assembly for integrating the motion of said four pair of pistons, said scotch yoke assembly comprising a first slide member having arms connecting first and second pairs of pistons and a second slide member having arms connecting said third and fourth pairs of pistons;

said first and second slide members having respectively first and second slots therein disposed at right angles to each other and adapted for reception of said eccentric crank portion of said stationary crank shaft, whereby said motion of said four pairs of pistons is integrated by the interaction of said eccentric crank portion with said first and second slots, thereby effecting sequential reciprocation of said four pairs of pistons, said sequential reciprocation of said four pairs of pistons in turn imparting a rotary motion to said housing;

transmission means for conveying said rotary motion of said housing to a selected external apparatus, as desired;

hub means rotatably mounted on said crankshaft and connected to said housing;

hose coupling means fixedly positioned relative to said crankshaft and in fluid communication with said hub means so as to selectively permit the passage of fluid under pressure to and from said hub means; and a plurality of tubing members interconnecting and in fluid communication with said hub means and said external valve means for conveying said fluid under pressure to or from said external valve means, as required.

8. The rotary hydraulic engine of claim 7 wherein said hose coupling means comprises;

a pair of oppositely disposed hose coupling members attached to the respective first and second ends of said stationary crankshaft.

9. The rotary hydraulic engine of claim 8 wherein said housing may be selectively rotated in a first direction or in a second opposite direction by means of selective connection of said hydraulic pressure means to a first one of said hose coupling members on alternatively a second one of said hose coupling members.

10. A rotary hydraulic engine comprising:

a stationary crank shaft having an eccentric crank portion disposed thereon;

a housing rotatable about said crankshaft;

four pairs of cylinders connected to said housing and quadrilaterally disposed thereon, each of said cylinders being oppositely disposed from its pair;

four pairs of pistons slidingly disposed within said four pairs of cylinders, and oppositely disposed from each other, each of said cylinders containing a respective piston, and each of said pairs of pistons being connected so as to move in tandem when propelled by a fluid under pressure;

hydraulic pressure means for providing said fluid under pressure to said four pairs of cylinders;

external valve means connected to said four pairs of cylinders for selectively permitting the passage of said fluid under pressure, thereby sequentially actuating said four pairs of pistons;

a scotch yoke assembly for integrating the motion of said four pairs of pistons, said scotch yoke assembly comprising a first slide member having arms connecting said first and second pairs of pistons and a second slide member having arms connecting said third and fourth pairs of pistons;

said first and second slide members having respectively first and second slots therein disposed at right angles to each other and adapted for reception of said eccentric crank portion of said stationary crank shaft, whereby said motion of said four pairs of pistons is integrated by the interaction of said eccentric crank portion with said first and second slots, thereby effecting sequential reciprocation of said four pairs of pistons, said sequential reciprocation of said four pairs of pistons in turn imparting a rotary motion to said housing;

transmission means for conveying said rotary motion of said housing to a selected external apparatus, as desired;

and wherein the first pair of cylinders comprise a first and second cylinder, the second pair of cylinders comprises a third and fourth cylinder, the third pair of cylinders comprises a fifth and sixth cylinder, and the fourth pair of cylinders comprises a seventh and eighth cylinder, and said plurality of shuttle valve members comprise;

a first shuttle valve member in fluid communication with said fifth and seventh cylinders at their proximal ends, and said sixth and eighth cylinders at their distal ends;

a second shuttle valve member in fluid communication with said second and fourth cylinders at their proximal ends and said first and third cylinders at their distal ends;

a third shuttle valve member in fluid communication with the proximal ends of said sixth and eighth cylinders and the distal ends of said fifth and seventh cylinders; and a fourth shuttle valve member in fluid communication with the proximal end of said first and third cylinders and the distal ends of said second and fourth cylinders, whereby said fluid under pressure may be supplied in sequence to said cylinders so as to sequentially propel said pistons, thereby imparting said rotary motion to said housing.

11. The rotary hydraulic engine of claim 10 wherein, during a first portion of said sequential reciprocation, said fourth shuttle valve member concurrently supplies said fluid under pressure to said proximal ends of said first and third cylinders and said distal ends of said second and fourth cylinders whereby said first through fourth pistons are propelled in a first force vector;

during a second portion of said sequential reciprocation, said first shuttle valve member concurrently supplies said fluid under pressure to said proximal ends of said fifth and seventh cylinders and said distal ends of said sixth and eighth cylinders whereby said fifth through eighth pistons are propelled in a second force vector;

during a third portion of said sequential reciprocation, said second shuttle valve member concurrently supplies said fluid under pressure to said distal ends of said first and third cylinders and said proximal ends of said second and fourth cylinders whereby said first through fourth pistons are propelled in a third force vector opposite to that of said first force vector; and during a fourth portion of said sequential reciprocation, said third shuttle valve member concurrently supplies said fluid under pressure to said distal ends of said fifth and seventh cylinder members and said proximal ends of said sixth and eighth cylinder members whereby said fifth through eighth pistons are propelled in a fourth force vector opposite to that of said second force vector;

said first through fourth portions of said sequential reciprocation overlapping each other so that as said respective pistons are propelled in said first through fourth force vectors, said rotary motion is imparted to said housing.

12. The rotary hydraulic engine of claim 10 wherein said hydraulic pressure means comprises a tank of compressed air.

13. The rotary hydraulic engine of claim 10 wherein said hydraulic pressure means comprises a high pressure compressed air line.

14. The rotary hydraulic engine of claim 10 wherein said housing may be selectively rotated in a first direction or in a second opposite direction by means of alternating the direction of flow of said fluid under pressure through said engine.

15. The rotary hydraulic engine of claim 10 wherein said fluid under pressure comprised compressed air, said hydraulic pressure means comprises a tank for the holding of compressed air and a switching valve member adapted for selective admission of compressed air into said tank or expulsion of said compressed air from said tank; and said rotation of said housing in a first direction is effective to draw air into said external valve means, to compress said air in said cylinders and to pump said compressed air from said cylinders through said external valve means, through said switching valve member and into said tank; and conversely, when said switching valve member is set for expulsion of said compressed air out of said tank, said rotation being effected by drive means connected to said engine for rotating said engine in said first direction; said drive means including means for selective engagement or disengagement with said engine, said compressed air is permitted to pass through said external valve means, and into said cylinders so as to propel said pistons, thereby causing said rotary motion of said housing in a second opposite direction whereby said improved rotary hydraulic engine may be utilized as a compressor for compressing compressed air into said tank and thereafter selectively used as a rotary engine driven by said compressed air in said tank.

16. The rotary engine of claim 10 wherein said transmission means comprises a pulley attached to said housing and rotatably disposed about said stationary crank shaft; and a belt drive disposed about said pulley and about a drive wheel of said external apparatus for the transmission of mechanical force thereto.

17. The rotary hydraulic engine of claim 10 wherein, said improved rotary hydraulic engine is adapted to selectively pump water through said cylinders, when driven by drive means connected to said rotary hydraulic engine.

18. A rotary hydraulic engine comprising:
a stationary crank shaft having an eccentric crank portion disposed thereon;
a housing rotatable about said crankshaft;
four pairs of cylinders connected to said housing and quadrilaterally disposed thereon, each of said cylinders being oppositely disposed from its pair;
four pairs of pistons slidingly disposed within said four pairs of cylinders, and oppositely disposed from each other, each of said cylinders containing a respective piston, and each of said pairs of pistons being connected so as to move in tandem when propelled by a fluid under pressure;
hydraulic pressure means for providing said fluid under pressure to said four pairs of cylinders;
external valve means connected to said four pairs of cylinders for selectively permitting the passage of said fluid under pressure, thereby sequentially actuating said four pairs of pistons;
a scotch yoke assembly for integrating the motion of said four pairs of pistons, said scotch yoke assembly comprising a first slide member having arms connecting said first and second pairs of pistons and a second slide member having arms connecting said third and fourth pairs of pistons;
said first and second slide members having respectively first and second slots therein disposed at right angles to each other and adapted for reception of said eccentric crank portion of said stationary crank shaft, whereby said motion of said four pairs of pistons is integrated by the interaction of said eccentric crank portion with said first and second slots, thereby effecting sequential reciprocation of said four pairs of pistons, said sequential reciprocation of said four pairs of pistons in turn imparting a rotary motion to said housing;
transmission means for conveying said rotary motion of said housing to a selected external apparatus, as desired;
hub means rotatably mounted on said crankshaft and connected to said housing;
hose coupling means fixedly positioned relative to said crankshaft and in fluid communication with said hub means so as to selectively permit the passage of fluid under pressure to and from said hub means;
a plurality of tubing members interconnecting and in fluid communication with said hub means and said external valve means for conveying said fluid under pressure to or from said external valve means, as required;
said hub means comprising a pair of oppositely disposed hub members extending substantially perpendicularly from, respectively the front and rear of said housing, each of said hub members being in substantial sealing relationship with said stationary crankshaft and having a fluid passageway therethrough juxtaposed to said crankshaft, said fluid passageway extending through said hub means to said tubing members for the passage of fluid under pressure; and
a plurality of ports in said crankshaft member juxtaposed to said fluid passageway in said hub means, said ports in said crankshaft having one or more lumens extending through said crankshaft to its respective ends and in fluid communication with said hose coupling means so as to selectively permit the passage of fluid under pressure through said hose coupling means, said lumens, said ports, said hub means, said tubing members and said external valve means as required.

* * * * *